(12) United States Patent
Sugitani et al.

(10) Patent No.: US 11,667,991 B2
(45) Date of Patent: Jun. 6, 2023

(54) LAMINATION SHAPING COPPER POWDER AND LAMINATED AND SHAPED PRODUCT

(71) Applicants: FUKUDA METAL FOIL & POWDER CO., LTD., Kyoto (JP); TECHNOLOGY RESEARCH ASSOCIATION FOR FUTURE ADDITIVE MANUFACTURING, Tokyo (JP)

(72) Inventors: Yuji Sugitani, Kyoto (JP); Yoshito Nishizawa, Shiga (JP); Takeshi Maruyama, Shiga (JP); Hiroaki Okubo, Shiga (JP)

(73) Assignees: FUKUDA METAL FOIL & POWDER CO., LTD., Kyoto (JP); TECHNOLOGY RESEARCH ASSOCIATION FOR FUTURE ADDITIVE MANUFACTURING, Tokyo (JP)

( * ) Notice: Subject to any disclaimer, the term of this patent is extended or adjusted under 35 U.S.C. 154(b) by 545 days.

(21) Appl. No.: 16/625,516

(22) PCT Filed: Jun. 21, 2017

(86) PCT No.: PCT/JP2017/022931
§ 371 (c)(1),
(2) Date: Dec. 20, 2019

(87) PCT Pub. No.: WO2018/235213
PCT Pub. Date: Dec. 27, 2018

(65) Prior Publication Data
US 2020/0180024 A1 Jun. 11, 2020

(51) Int. Cl.
*C22C 1/04* (2023.01)
*B33Y 70/00* (2020.01)
(Continued)

(52) U.S. Cl.
CPC ............... *B33Y 70/00* (2014.12); *B33Y 10/00* (2014.12); *C22C 1/0425* (2013.01); *B22F 1/00* (2013.01);
(Continued)

(58) Field of Classification Search
CPC ....... C22C 1/0425; B33Y 80/00; B33Y 70/00; B33Y 10/00; B33Y 30/00; B22F 12/00;
(Continued)

(56) References Cited

FOREIGN PATENT DOCUMENTS

CN 1950162 A 4/2007
CN 101896629 A 11/2010
(Continued)

OTHER PUBLICATIONS

Gu and Shen, Influence of Phosphorus Element on Direct Laser Sintering of Multicomponent Cu-Based Metal Powder, Dec. 2006, Metallurgical and Materials Transactions, vol. 37B, pp. 967-977 (Year: 2006).*

(Continued)

*Primary Examiner* — Monica A Huson
*Assistant Examiner* — Kelsey C Grace
(74) *Attorney, Agent, or Firm* — Ladas & Parry LLP

(57) ABSTRACT

In this invention, a copper powder to which phosphorus (P) is added is developed such that a high-density laminated and shaped product can be obtained by a laminating and shaping method using a fiber laser as a heat source by appropriately reducing the electrical conductivity of copper, so a laminated and shaped product having a high density and a high electrical conductivity can be obtained. This invention is a copper powder for lamination shaping in which a phosphorus element is added to pure copper. The copper powder desirably contains 0.01 wt % or more of the phosphorus element. The copper powder more desirably contains 0.04 wt % or more of the phosphorus element. The copper (Continued)

powder desirably contains 0.30 wt % or less of the phosphorus element. The copper powder more desirably contains 0.24 wt % or less of the phosphorus element. No element other than the phosphorus element is desirably added to the copper powder.

7 Claims, 14 Drawing Sheets

(51) Int. Cl.
  *B33Y 10/00*    (2015.01)
  *B33Y 30/00*    (2015.01)
  *B29C 64/153*    (2017.01)
  *B22F 1/00*    (2022.01)
  *B22F 3/16*    (2006.01)
  *B22F 10/10*    (2021.01)
  *B22F 10/28*    (2021.01)
  *B22F 12/41*    (2021.01)
  *B22F 1/052*    (2022.01)

(52) U.S. Cl.
  CPC .............. *B22F 1/052* (2022.01); *B22F 3/16* (2013.01); *B22F 10/10* (2021.01); *B22F 10/28* (2021.01); *B22F 12/41* (2021.01); *B22F 2999/00* (2013.01); *B29C 64/153* (2017.08); *B33Y 30/00* (2014.12)

(58) Field of Classification Search
  CPC .... B22F 1/00; B22F 3/16; B22F 10/20; B22F 2999/00; B22F 10/10; B22F 1/052; B29C 64/153; Y02P 10/25
  See application file for complete search history.

(56) References Cited

FOREIGN PATENT DOCUMENTS

| | | | |
|---|---|---|---|
| CN | 105506340 | A | 4/2016 |
| CN | 106623953 | A | 5/2017 |
| JP | 2000336403 | A | 12/2000 |
| JP | 2005-222737 | A | 8/2005 |
| JP | 2010013726 | A | 1/2010 |
| JP | 4888769 | B2 | 2/2012 |
| JP | 201653198 | A | 4/2016 |
| JP | 2016211062 | A | 12/2016 |
| JP | 2017048461 | A | 3/2017 |

OTHER PUBLICATIONS

Chen, et al., The influence of phosphorus on the catalytic properties, durability, sulfur resistance and kinetics of Cu—SSZ-13 for NOx reduction by NH3—SCR, May 28, 2018, Applied Catalysis B: Environmental, pp. 116-127 (Year: 2018).*
Chinese office action with an English transition dated May 6, 2021 for Application No. CN 201780091916.X.
Espacenet English abstract of CN 106623953 A.
Espacenet English abstract of CN 101896629 A.
Espacenet English abstract of CN 105506340 A.
Espacenet English abstract of CN 1950162 A.
International Search Report (ISR) and Written Opinion (WO) dated Sep. 12, 2017 for Application No. PCT/JP2017/022931.
Espacenet English abstract for JP 2000336403 A.
Espacenet English abstract for JP 201653198 A.
Espacenet English abstract for JP 2016211062 A.
Japanese Office Action with an English translation dated Jul. 13. 2021 for corresponding Application No. JP 2019-524788.
Extended European Search Report dated Dec. 3, 2020 for Application No. EP 17914399.5.
Patent Abstracts of Japan English abstract of JP 2010013726 A.
Patent Abstaas of Japan English abstract of JP 2017048461 A.
Espacanet English abstract of JP 4888769 B2.

\* cited by examiner

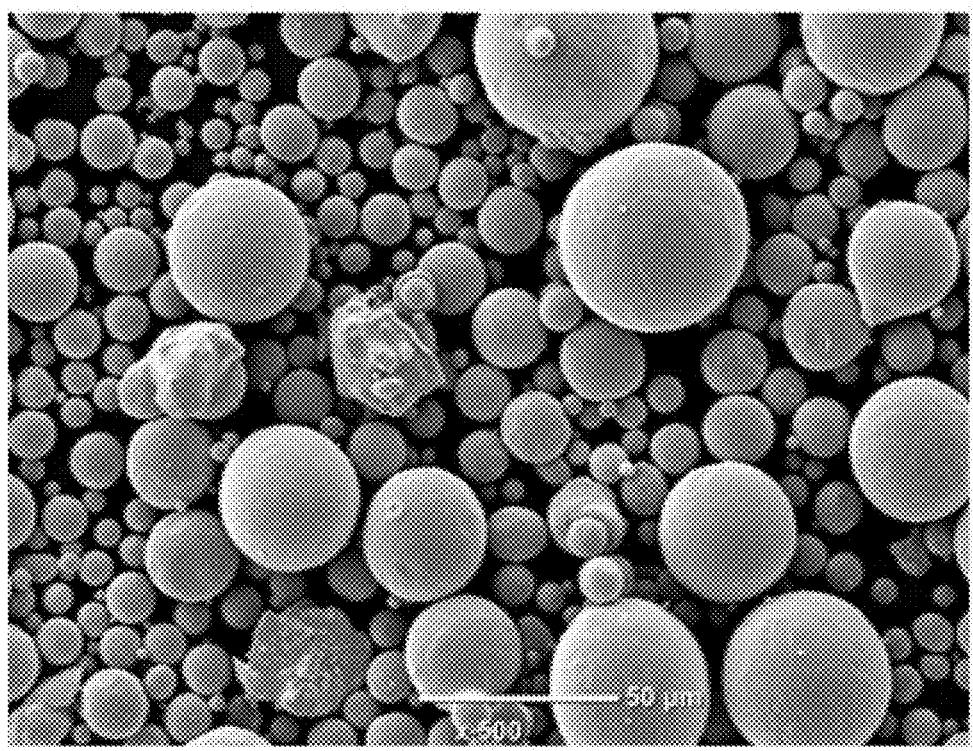
F I G. 2C

LAMINATION SHAPING COPPER POWDER AND LAMINATED AND SHAPED PRODUCT

RELATED APPLICATION

This application is an application under 35 U.S.C. 371 of International Application No. PCT/JP2017/022931 filed on Jun. 21, 2017, the entire contents of which are incorporated herein by reference.

TECHNICAL FIELD

The present invention relates to a copper powder for lamination shaping and a laminated and shaped product.

BACKGROUND ART

Laser-beam lamination shaping uses a fiber laser as a heat source, and forms an arbitrary shape by melting and solidifying a powder bed on which a metal powder is spread. There are examples in which high-density molded products can be obtained by using an iron alloy (to be referred to as an Fe alloy) and a nickel alloy (to be referred to as a Ni alloy). However, pure copper is an element having a high electrical conductivity and a high thermal conductivity, and is expected to form an electrically conductive product and a thermally conductive part having complicated shapes by using laser-beam lamination shaping. However, pure copper has not been put into practical use because it is impossible to form a laminated and shaped product having a high density of 98.5% or more at which a coolant such as a gas or water does not leak.

In the above technical field, patent literature 1 discloses, as a copper alloy powder for forming a laminated and shaped product having a relative density of 96% or more, a copper alloy powder containing a total of 1.00 mass % or less of at least one of Cr (chromium) and Si (silicon), and copper as the balance. Cited literature 2 discloses a copper alloy powder containing Cu (copper) as a main metal element, and Zn (zinc), Mn (manganese), Al (aluminum), and Fe (iron) as additive elements, as an example of a copper alloy powder for forming a laminated and shaped product.

CITATION LIST

Patent Literature

Patent literature 1: Japanese Patent Laid-Open No. 2016-211062

Patent literature 2: Japanese Patent Laid-Open No. 2016-053198

SUMMARY OF THE INVENTION

Technical Problem

The abovementioned patent literatures, however, do not mention that the thermal conductivity of copper exerts influence on the density of a laminated and shaped product, which affects the mechanical strength of a laminated and shaped product containing copper as a main component.

The present inventors have found that a high electrical conductivity of pure copper makes it impossible to obtain a high-density product by laminating and shaping using a fiber laser as a heat source. This is so because thermal energy required to melt a pure copper powder cannot be obtained because a laser beam is reflected during laser irradiation.

The present invention provides a technique of solving the above-described problem.

Solution to Problem

One example aspect of the present invention provides a lamination shaping copper powder obtained by adding a phosphorus element to pure copper.

Another example aspect of the present invention provides a laminated and shaped product mainly containing copper, which is laminated and shaped by a laminating and shaping apparatus by using the lamination shaping copper powder described above.

Advantageous Effects of Invention

According to the present invention, in order to obtain a high-density product by a laminating and shaping method using a fiber laser as a heat source by appropriately decreasing the electrical conductivity of copper, a copper powder to which phosphorus (P) is added is provided, and a laminated and shaped product having a high density and a high electrical conductivity can be obtained.

BRIEF DESCRIPTION OF DRAWINGS

FIG. 2C is a view showing an SEM image of a copper powder according to Example 3 of the present invention;

DESCRIPTION OF EXAMPLE EMBODIMENTS

Figure 1:
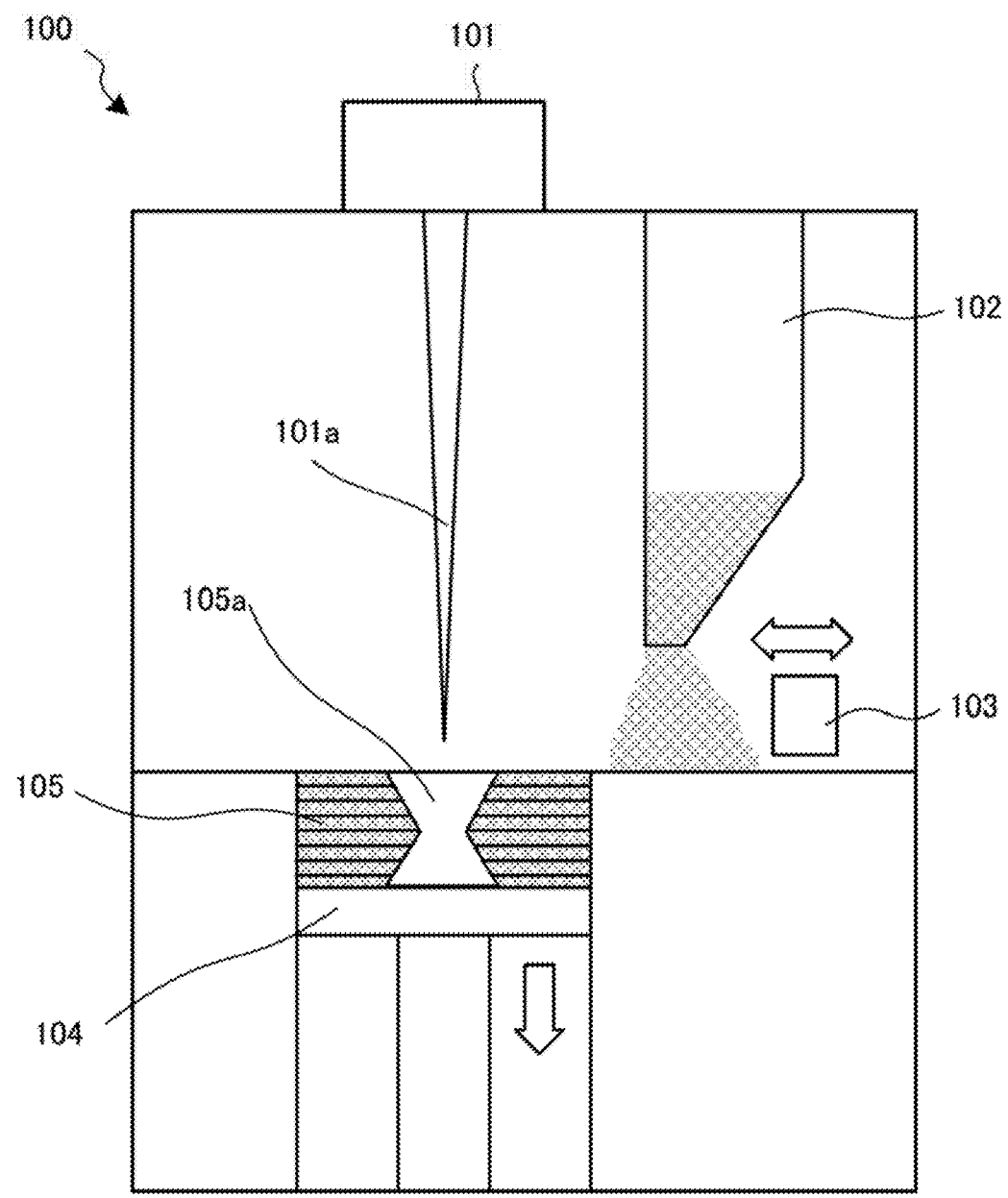
FIG. 1 is a view showing a configuration example of a laminating and shaping apparatus of an example embodiment according to the present invention.
Figure 2A:
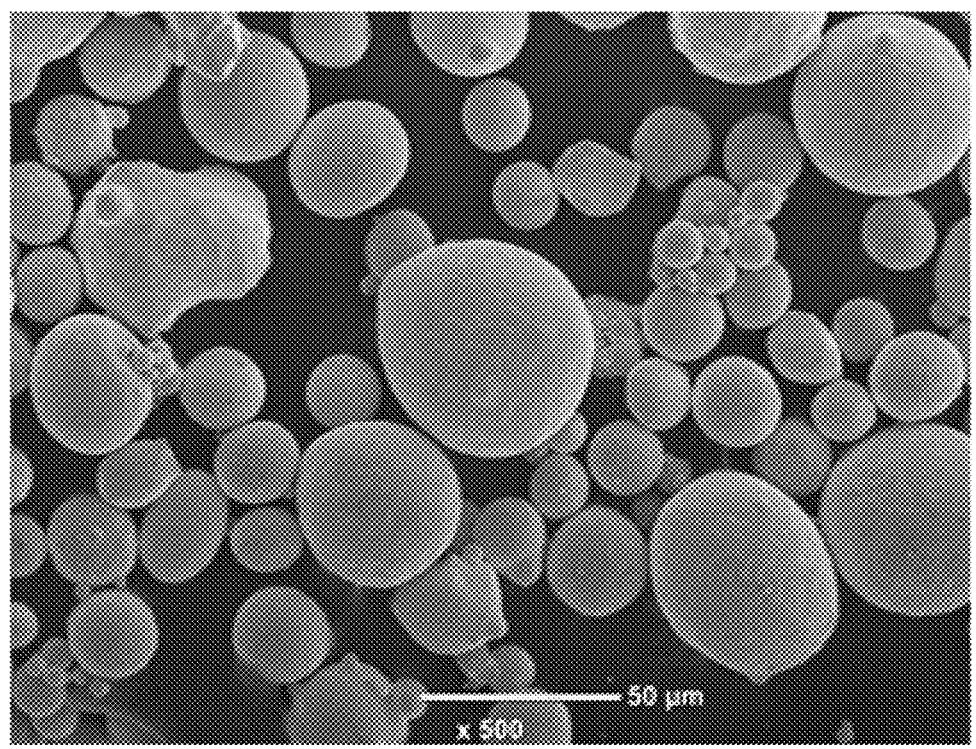
FIG. 2A is a view showing a scanning electron microscope (SEM) image of a copper powder according to Example 1 of the present invention.
Figure 2B:
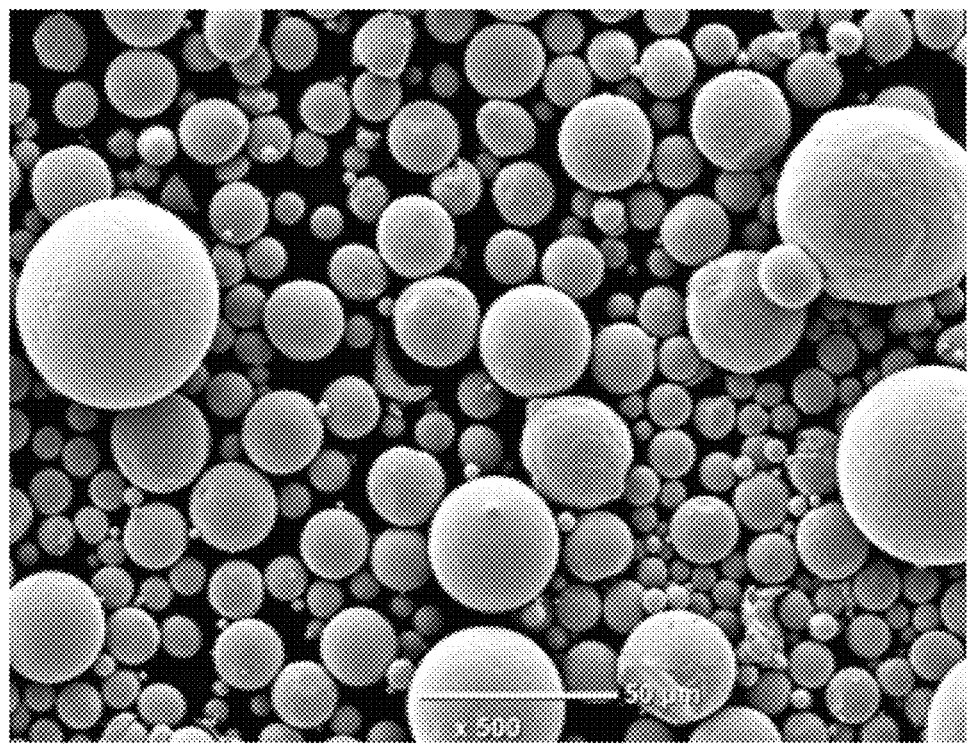
FIG. 2B is a view showing an SEM image of a copper powder according to Example 2 of the present invention.
Figure 2D:
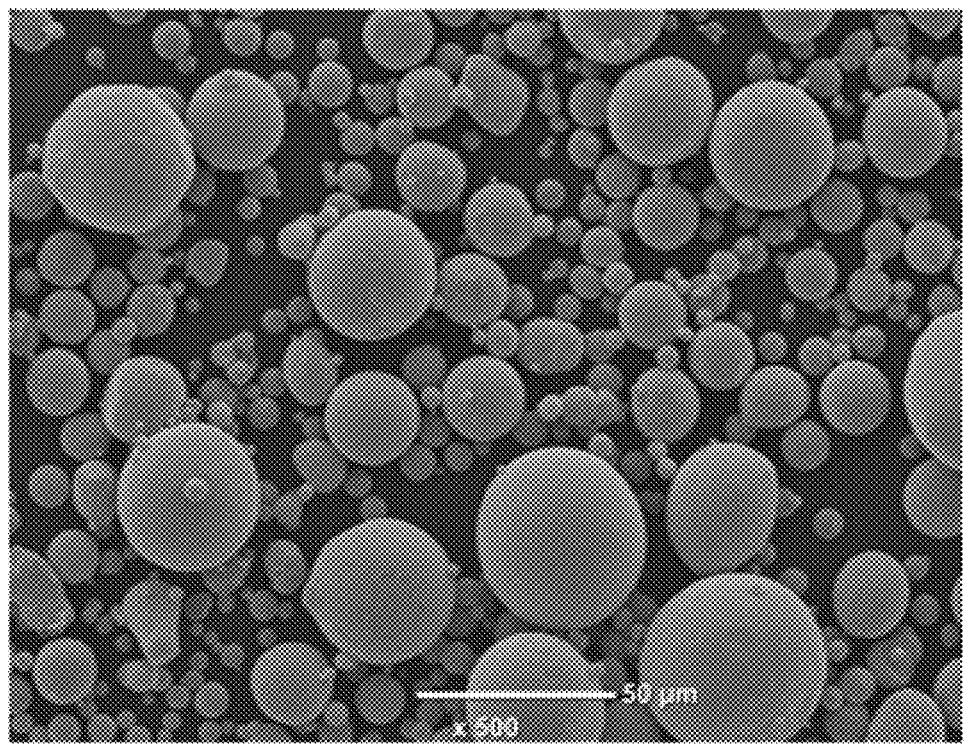
FIG. 2D is a view showing an SEM image of a copper powder according to Example 4 of the present invention.
Figure 2E:
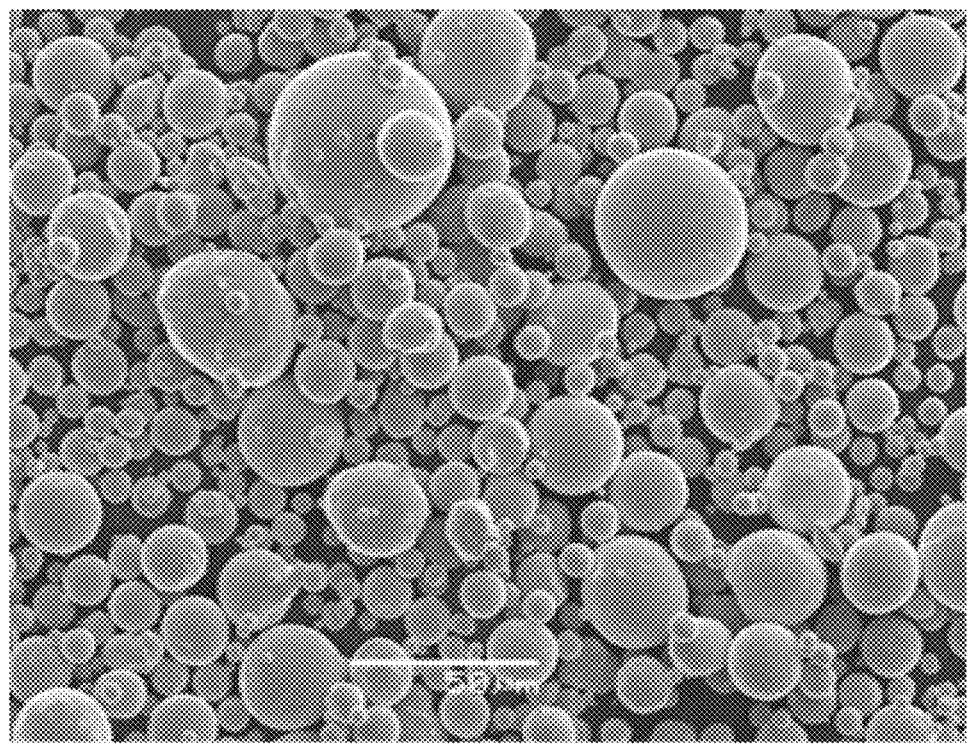
FIG. 2E is a view showing an SEM image of a copper powder according to Example 5 of the present invention.

Example embodiments of the present invention will now be described in detail with reference to the drawings. It should be noted that the relative arrangement of the components, the numerical expressions and numerical values set forth in these example embodiments do not limit the scope of the present invention unless it is specifically stated otherwise.

Applications of Laminated and Shaped Product Obtained by Laminating and Shaping Using Copper Powder of Example Embodiment A copper powder used in this example embodiment is used as a material of lamination shaping. When a laminated and shaped product using the copper powder can be formed, fine shaping can be performed in the fields of an electric circuit connector, a heat sink, a heat exchanger, and the like.

In these applications, a laminated and shaped product using the copper powder desirably has a sufficient density (a density measured by the method of Archimedes is 98.5% or more). Also, when using the electrical conductivity or thermal conductivity of copper, a laminated and shaped product desirably has an electrical conductivity (20% IACS or more) sufficient as a copper product. If the aforementioned measurement density is less than 98.5%, a problem such as a water leak arises. In addition, when using a laminated and shaped product as, e.g., a spring material for a terminal, a conductivity of 20% IACS or more is necessary. Note that a laminated and shaped product using the copper powder is not limited to the above examples, and can also be used as another circuit component or an electromagnetic wave shield component.

Copper Powder of this Example Embodiment

When using a pure copper powder, a laser beam is reflected due to a high electrical conductivity during laser irradiation, so thermal energy required to melt the pure copper powder cannot be obtained. This makes it impossible to obtain a high-density product by a laminating and shaping method using a fiber laser as a heat source.

Accordingly, this example embodiment provides a copper powder that can be laminated and shaped, and that gives a laminated and shaped product formed by using the copper powder the sufficient density described above and the above-described electrical conductivity sufficient as a copper product. That is, the electrical conductivity can be adjusted by blending a phosphorus (P) element in copper. Then, the copper is adjusted to have a particle shape and particle size suitable for a laminating and shaping method, and can be provided as a copper alloy powder for lamination shaping.

(Conditions of Lamination Shaping Copper Powder)

The following conditions are necessary for a copper powder that can be laminated and shaped.

(1) The 50% particle size of copper powder particles is 3 to 75 μm when measured by a laser diffraction method. If the 50% particle size of the copper powder particles is smaller than 3 μm, the particles have no flowability, so no powder bed can be formed in a laminating and shaping apparatus. On the other hand, if the 50% particle size of the copper powder particles is larger than 75 μm, the surface of a powder bed is roughened in a laminating and shaping apparatus, so no powder bed appropriate for laminating and shaping can be formed.

(2) The apparent density (AD) of the copper powder is 3.0 g/cm$^3$ or more. If the AD of the copper powder is less than 3.0 g/cm$^3$, the powder packing ratio of a powder bed decreases in a laminating and shaping apparatus, so no appropriate powder bed can be formed.

(3) The flow rate (FR) of the copper powder is 60 sec/50 g or less. If the FR of the copper powder is 60 sec/50 g or more, no powder can be supplied from a supply hopper in a laminating and shaping apparatus, so no appropriate powder bed can be formed.

(Method of Manufacturing Lamination Shaping Copper Powder)

The lamination shaping copper powder of this example embodiment can be manufactured by, e.g., "a rotating disk method", "a gas atomizing method", "a water atomizing method", "a plasma atomizing method", or "a plasma rotating electrode method". In this example embodiment, "the gas atomizing method" was used among these methods. In this gas atomization, a gas such as helium, argon, or nitrogen was used, and a copper powder was manufactured by controlling powdering by adjusting the pressure and flow rate of the gas. However, a similar copper powder can also be manufactured by using another manufacturing method. The manufactured copper powder was classified by a classification size of 10 to 45 μm.

(Measurement of Characteristics of Lamination shaping Copper Powder)

The following characteristics of the manufactured lamination shaping copper powder were measured.

(1) The content of a phosphorus element of the copper powder to which the phosphorus element was added was measured by molybdovanadophosphoric acid absorption spectrophotometry according to JIS Z 3264.

(2) The apparent density (g/cm$^3$) of the copper powder to which a phosphorus element was added was measured in accordance with JIS Z 2504.

(3) The flow rate (sec/50 g) of the copper powder to which a phosphorus element was added was measured in accordance with JIS Z 2502.

(4) The 50% particle size (μm) was measured by a laser diffraction method.

(5) An image of the manufactured copper powder was captured by using an SEM (Scanning Electron Microscope).

(Evaluation of Measurement Results)

The lamination shaping copper powder to which a phosphorus element was added according to this embodiment satisfied all of (1) the 50% particle size of the copper powder particles, (2) the apparent density of the copper powder, and (3) the flow rate of the copper powder, as the abovementioned conditions in which the lamination shaping by the laminating and shaping apparatus is possible.

Manufacture of Laminated and Shaped Product of this Example Embodiment

FIG. 1 is a view showing a schematic configuration example of a laminating and shaping apparatus 100 of this embodiment. The laminating and shaping apparatus 100 includes an emission mechanism 101 for an electron beam or fiber laser 101a, a hopper 102 as a powder tank, a squeezing blade 103 for forming a powder bed by spreading a powder by a predetermined thickness, and a table 104 that repetitively moves down by a predetermined thickness in order to perform lamination. The squeezing blade 103 and the table 104 cooperate with each other to generate a powder laminated portion 105 having a uniform predetermined thickness. Each layer is irradiated with the fiber laser 101a based on slice data obtained from 3D-CAD data, thereby melting a metal powder (in this example embodiment, a copper powder) and manufacturing a laminated and shaped product 105a.

Note that an energy density E (J/mm³) used was adjusted by E=P/(v×s×t) where t: the thickness of the powder bed, P: the output of the laser, v: the operation speed of the laser, and s: the laser scanning pitch.

(Conditions of Laminated and Shaped Product)

The following conditions are necessary for a useful laminated and shaped product of this embodiment. Of the following conditions, condition (1) is a condition essential to obtain the strength of the laminated and shaped product. On the other hand, condition (2) is a condition that is not essential when the laminated and shaped product is not required to have the electrical conductivity and thermal conductivity of copper, and is a condition when using the electrical conductivity and thermal conductivity of copper.
(1) A laminated and shaped product using a copper powder has a sufficient density. For example, the measurement density obtained by the method of Archimedes is 98.5% or more.
(2) A laminated and shaped product using a copper powder has an electrical conductivity sufficient as a copper product. For example, the electrical conductivity is 20% IACS or more.

(Measurement of Characteristics of Laminated and Shaped Product)

The following characteristics were measured for a laminated and shaped product manufactured by using a lamination shaping copper powder.
(1) The electrical conductivity (% IACS) of the laminated and shaped product was measured by using an eddy current type conductivity meter.
(2) The density (%) of the laminated and shaped product was measured by the method of Archimedes by using helium gas as a substitution medium.
(3) An image of the surface of the manufactured laminated and shaped product was captured by using an SEM (Scanning Electron Microscope).

(Evaluation of Measurement Results)

As the laminated and shaped product manufactured by a laminating and shaping apparatus by using the lamination shaping copper powder to which a phosphorus element was added according to this example embodiment, a laminated and shaped product satisfying abovementioned condition (1) the density is 98.5% or more was manufactured. In addition, a laminated and shaped product satisfying (2) the electrical conductivity is 20% IACS or more was manufactured.

(Composition of Preferable Lamination Shaping Copper Powder)

This example embodiment provides, by adding a phosphorus element to pure copper, a copper powder that satisfies the aforementioned conditions of the lamination shaping copper powder, and allows a laminated and shaped product manufactured by laminating and shaping by a laminating and shaping apparatus to have the abovementioned sufficient density and an electrical conductivity sufficient as a copper product.

The lamination shaping copper powder of this example embodiment is desirably a copper powder formed by adding 0.01 wt % or more of a phosphorus element to pure copper, and more desirably a copper powder formed by adding 0.04 wt % or more of a phosphorus element to pure copper.

Also, when using the electrical conduction and thermal conduction of copper, the lamination shaping copper powder of this example embodiment is desirably a copper powder formed by adding 0.30 wt % or less of a phosphorus element to pure copper, and more desirably a copper powder formed by adding 0.24 wt % or less of a phosphorus element to pure copper.

In addition, the lamination shaping copper powder of this example embodiment is desirably a copper powder to which elements other than a phosphorus element are not added.

Effects of this Example Embodiment

According to this example embodiment, it was possible to provide a lamination shaping copper powder to which a phosphorus element was added, and obtain a high-density laminated and shaped product. Furthermore, it was possible to obtain a laminated and shaped product having a high electrical conductivity.

That is, the 50% particle size of the particles of the copper powder is 3 to 75 μm when measured by a laser diffraction method. Therefore, the surface of a powder bed is not roughened, and a sufficient flowability facilitates squeezing. Also, since the apparent density of the copper powder is 3.0 g/cm³ or more, the powder packing ratio of a powder bed is sufficient, so an appropriate powder bed can be formed. In addition, the flow rate of the copper powder is 60 sec/50 g or less. This makes it possible to smoothly supply the powder from the supply hopper, and form an appropriate powder bed.

Also, a high-density laminated and shaped product was obtained because the thermal energy necessary for laminating and shaping was decreased by decreasing the electrical conductivity by the addition of a phosphorus element. That is, it was possible to manufacture a laminated and shaped product by using a copper powder by which the density of a laminated and shaped product, which was laminated and shaped under the condition set by the energy density that can be calculated from the laser power, the scan speed, the scan pitch, and the lamination thickness of a powder bed, was 98.5% or more when measured by the method of Archimedes. Furthermore, a laminated and shaped product was manufactured by using a copper powder having an electrical conductivity satisfying 20% IACS or more. Note that the thermal conductivity corresponds to the electrical conductivity by the Wiedemann-Frantz law, so the same applies to a laminated and shaped product manufactured by using a copper powder satisfying a desired thermal conductivity.

EXAMPLES

Examples 1 to 5 according to this example embodiment and Comparative Example 1 will be explained below.

Manufacture of Lamination Shaping Copper Powders

By using gases such as helium, argon, and nitrogen as gas atomization of a gas atomizing method, copper powders to which a phosphorus element was added were generated by controlling powdering by adjusting the pressure and flow rate of each gas.

The copper powders were manufactured by changing the content of the phosphorus element in pure copper after the addition to 0.240 (Example 1), 0.170 (Example 2), 0.080 (Example 3), 0.030 (Example 4), 0.015 (Example 5), and 0.002 (Comparative Example 1).

Measurement of Characteristics of Lamination Shaping Copper Powders

Figure 3:
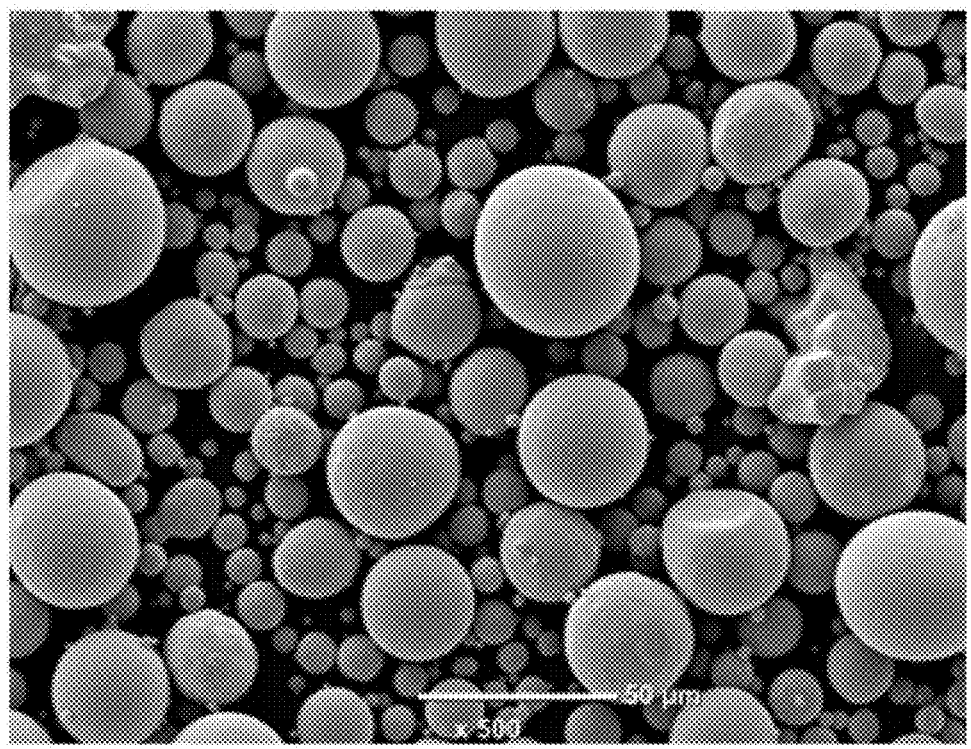
FIG. 3 is a view showing an SEM image of a copper powder according to Comparative Example 1.
Figure 4A:
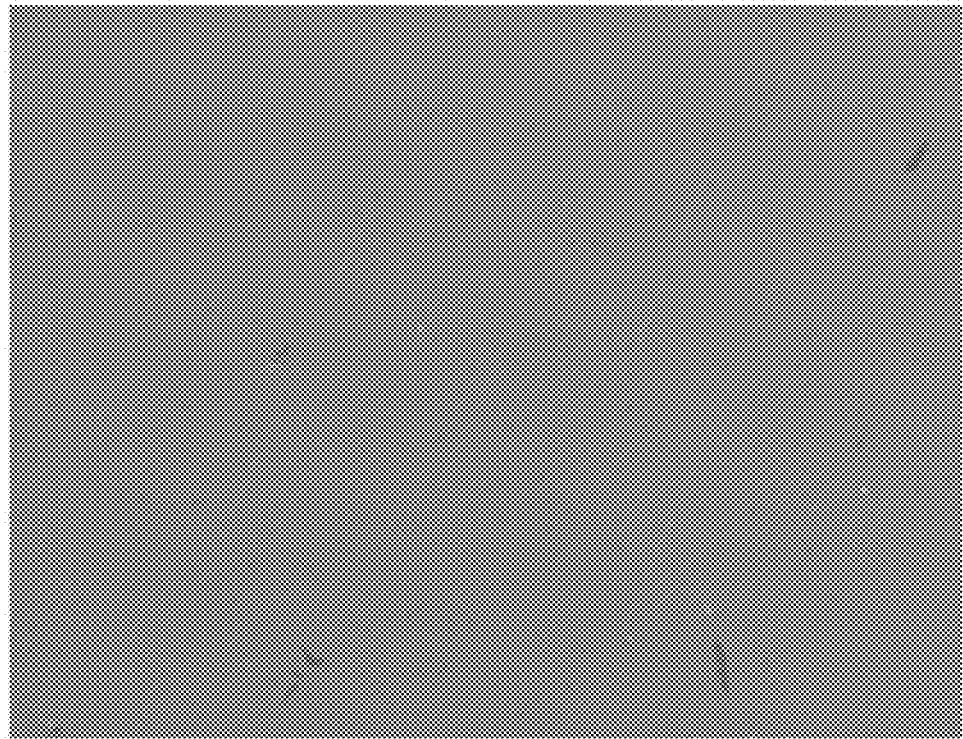
FIG. 4A is a view showing an SEM image of a laminated and shaped product using the copper powder according to Example 1 of the present invention.
Figure 4B:
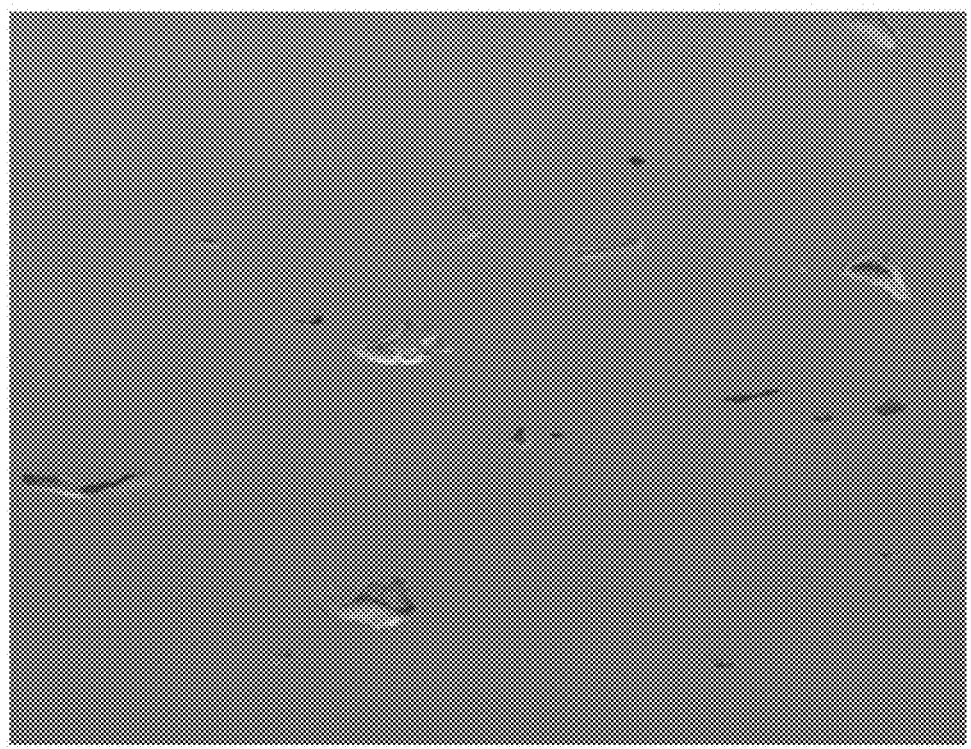
FIG. 4B is a view showing an SEM image of a laminated and shaped product using the copper powder according to Example 2 of the present invention.
Figure 4C:
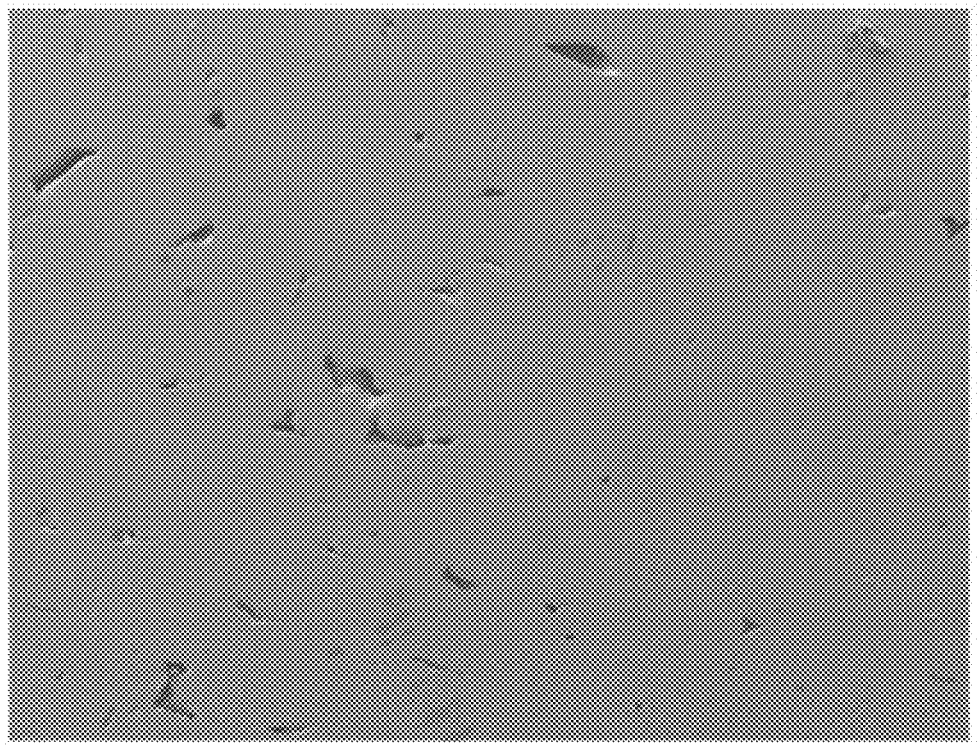
FIG. 4C is a view showing an SEM image of a laminated and shaped product using the copper powder according to Example 3 of the present invention.
Figure 4D:
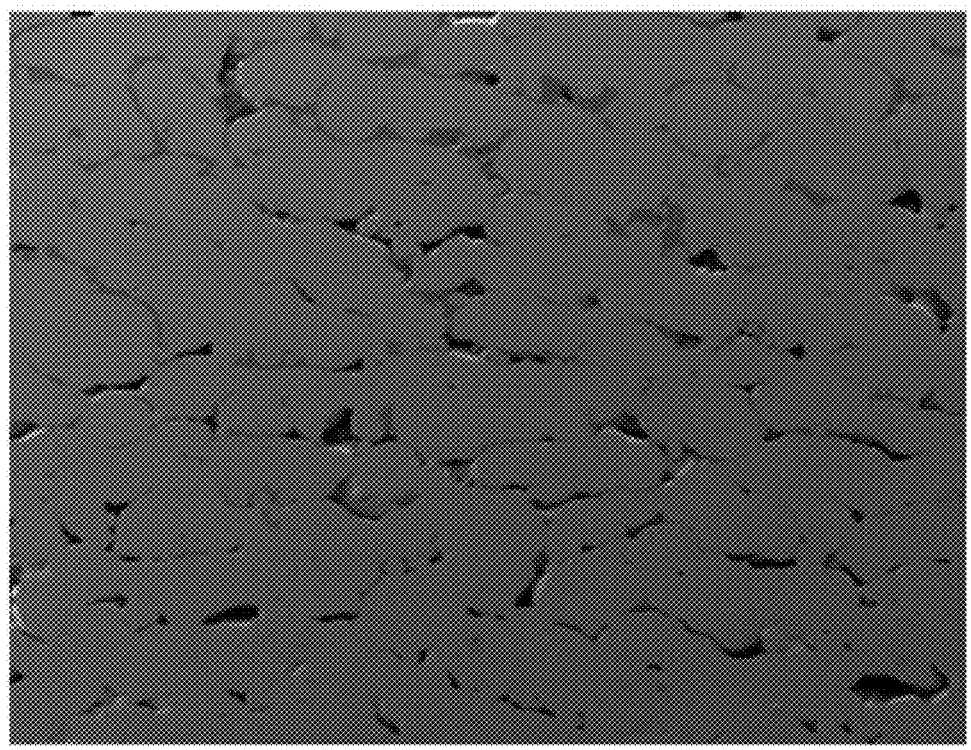
FIG. 4D is a view showing an SEM image of a laminated and shaped product using the copper powder according to Example 4 of the present invention.
Figure 4E:
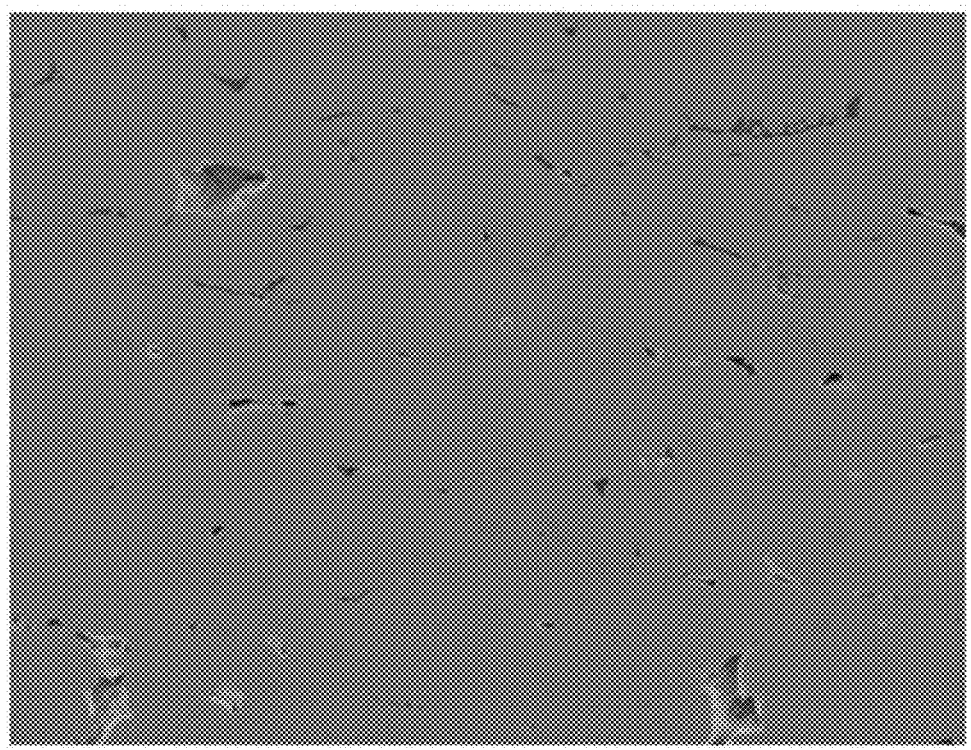
FIG. 4E is a view showing an SEM image of a laminated and shaped product using the copper powder according to Example 5 of the present invention.

Images of the manufactured copper powders were captured by using an SEM (Scanning Electron Microscope) (SEM×500). FIGS. 2A to 2E show the SEM images of the copper powders of Examples 1 to 5. FIG. 3 shows the SEM image of the copper powder of Comparative Example 1.

The content of the phosphorus element in the copper powder to which the phosphorus element was added was measured, by using molybdovanadophosphoric acid absorption spectrophotometry according to JIS Z 3264 (SHIMADZU UV-1800: manufactured by Shimadzu). Also, the apparent density (g/cm$^3$) of the copper powder to which the phosphorus element was added was measured in accordance with JIS Z 2504. In addition, the flow rate (sec/50 g) of the copper powder to which the phosphorus element was added was measured in accordance with JIS Z 2502. Furthermore, the 50% particle size (Lm) was measured by a laser diffraction method (MICROTRACK MT3300: manufactured by MicrotackBELL). Table 1 shows the characteristics of the manufactured copper powders of Examples 1 to 5 and Comparative Example 1.

TABLE 1

Characteristics of Manufactured Copper Powders

| | Classification size (μm) | AD (g/cm$^3$) | FR (sec/50 g) | 50% particle size (μm) | Cu wt % | P wt % | O wt % |
|---|---|---|---|---|---|---|---|
| Example 1 | 10-45 | 4.95 | 10.5 | 40.5 | Bal. | 0.240 | 0.04 |
| Example 2 | 10-45 | 5.06 | 14.8 | 30.9 | Bal. | 0.170 | 0.02 |
| Example 3 | 10-45 | 5.06 | 17.4 | 31.0 | Bal. | 0.080 | 0.03 |
| Example 4 | 10-45 | 4.94 | 18.0 | 30.0 | Bal. | 0.030 | 0.02 |
| Example 5 | 10-45 | 5.07 | 18.4 | 29.9 | Bal. | 0.015 | 0.03 |
| Comparative Example 1 | 10-45 | 4.92 | 20.1 | 30.0 | Bal. | 0.002 | 0.02 |

According to Table 1, the lamination shaping copper powders to which the phosphorus element was added according to this embodiment were powders satisfying all of (1) the 50% particle size of the copper powder particles, (2) the apparent density of the copper powder, and (3) the flow rate of the copper powder, as the aforementioned conditions in which the lamination shaping by the laminating and shaping apparatus is possible.

Manufacture of Laminated and Shaped Products

Laminated and shaped products were manufactured by a 3D laminating and shaping machine (powder sintering laminate molding/SLM method) by using the copper powders of Examples 1 to 5 and Comparative Example 1.

Laminated and shaped products were manufactured by changing the energy density (J/mm$^3$) by using the copper powders of Examples 1 to 5 and Comparative Example 1. Table 2 shows the energy density (J/mm$^3$).

TABLE 2

Energy Density of Laminated and shaped products

| | | | | |
|---|---|---|---|---|
| Energy density (J/mm$^3$) | 800.0 | 533.3 | 400.0 | 355.6 |
| Laser output (W) | 800 | 800 | 800 | 800 |
| Laser scanning speed (mm/sec) | 400 | 600 | 800 | 600 |
| Laser scanning pitch (mm) | 0.050 | 0.050 | 0.050 | 0.075 |
| Thickness of powder bed (mm) | 0.050 | 0.050 | 0.050 | 0.050 |

As the characteristic measuring laminated and shaped product samples, parallepiped laminated and shaped products each having 10 mm (width)×7 mm (depth)×5 mm (height) were manufactured.

Measurement of Characteristics of Laminated and Shaped Products

Figure 5:
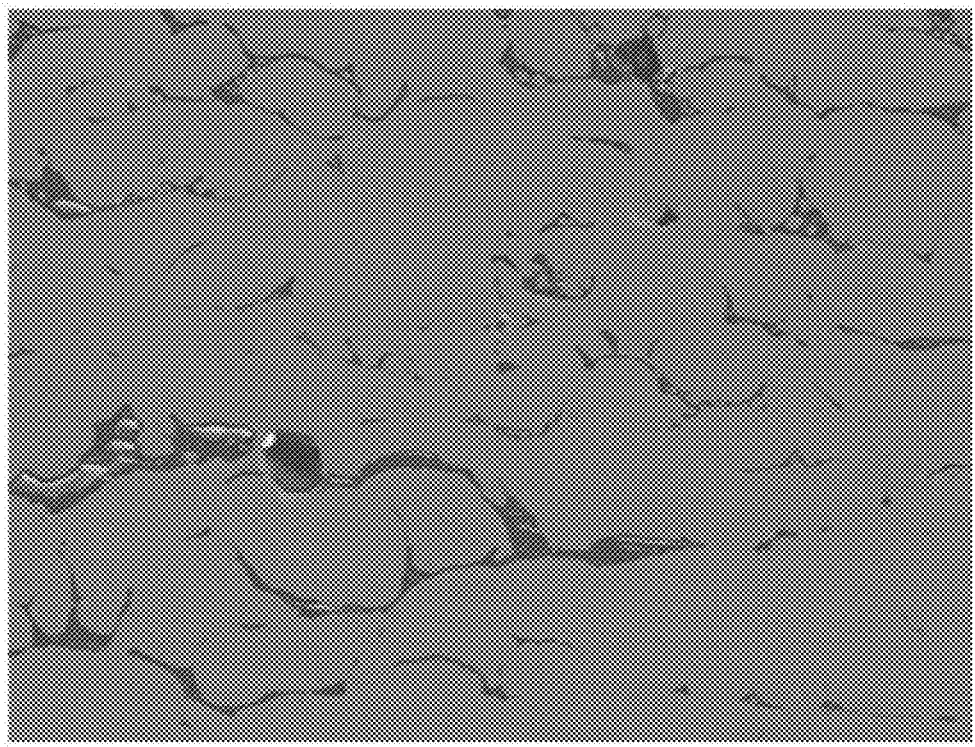
FIG. 5 is a view showing an SEM image of a laminated and shaped product using the copper powder according to Comparative Example 1.

Images of the surfaces of the manufactured laminated and shaped products were captured by using an SEM (Scanning Electron Microscope) (SEM×100). FIGS. 4A to 4E show the SEM images of the laminated and shaped products of Examples 1 to 5. FIG. 5 shows the SEM image of the laminated and shaped product of Comparative Example 1. Note that Examples 1 to 3 and 5 and Comparative Example 1 are SEM images of laminated and shaped products obtained by performing lamination shaping at 800 J/mm$^3$, and Example 4 (FIG. 4D) is an SEM image of a laminated and shaped product obtained by performing lamination shaping at 400 J/mm$^3$ by which the density of the laminated and shaped product was higher than the target (98.7%).

Also, the electrical conductivity (% IACS) of the laminated and shaped product was measured by using an eddy current type conductivity meter (a high-performance eddy current type conductivity meter Sigma Checker: manufactured by NIHON MATECH). In addition, the density (%) of the laminated and shaped product was measured by the method of Archimedes by using helium gas as a substitution medium (AccuPyc 1330: manufactured by Shimadzu). Table 3 shows the characteristics of the manufactured laminated and shaped products of Examples 1 to 5 and Comparative Example 1.

TABLE 3

Characteristics of Laminated and shaped products Using Copper Powders

| | | Laminated and shaped product density (%) | | | | Electrical conductivity (% IACS) | | |
|---|---|---|---|---|---|---|---|---|
| | | | | | | | 800.0 J/mm³ | 400.0 J/mm³ |
| | Amount of P wt % | 800.0 J/mm³ | 533.3 J/mm³ | 400.0 J/mm³ | 355.6 J/mm³ | Bulk | shaped product | shaped product |
| Example 1 | 0.240 | 99.8 | 99.2 | 99.8 | 98.4 | 38.1 | 26.5 | 21.0 |
| Example 2 | 0.170 | 98.9 | 99.0 | 98.9 | 100.0 | 46.8 | 32.7 | 23.0 |
| Example 3 | 0.080 | 99.7 | 99.3 | 99.7 | 99.0 | 60.5 | 41.2 | 28.3 |
| Example 4 | 0.030 | 98.0 | 97.6 | 98.7 | 98.5 | 84.3 | 40.9 | 24.8 |
| Example 5 | 0.015 | 98.5 | 98.2 | 97.4 | — | 95.2 | 40.7 | 22.0 |
| Comparative Example 1 | 0.002 | 98.3 | 97.1 | 98.5 | — | 103.7 | 49.2 | 20.1 |

| | | Laminated and shaped product density (%) | | | |
|---|---|---|---|---|---|
| | Amount of P wt % | 800.0 J/mm³ | 533.3 J/mm³ | 400.0 J/mm³ | 355.6 J/mm³ |
| Example 1 | 0.240 | ◎ | ◎ | ◎ | X |
| Example 2 | 0.170 | ○ | ◎ | ○ | ◎ |
| Example 3 | 0.080 | ◎ | ◎ | ◎ | ◎ |
| Example 4 | 0.030 | X | X | ○ | ○ |
| Example 5 | 0.015 | ○ | X | X | — |
| Comparative Example 1 | 0.002 | X | X | X | — |

Figure 6:
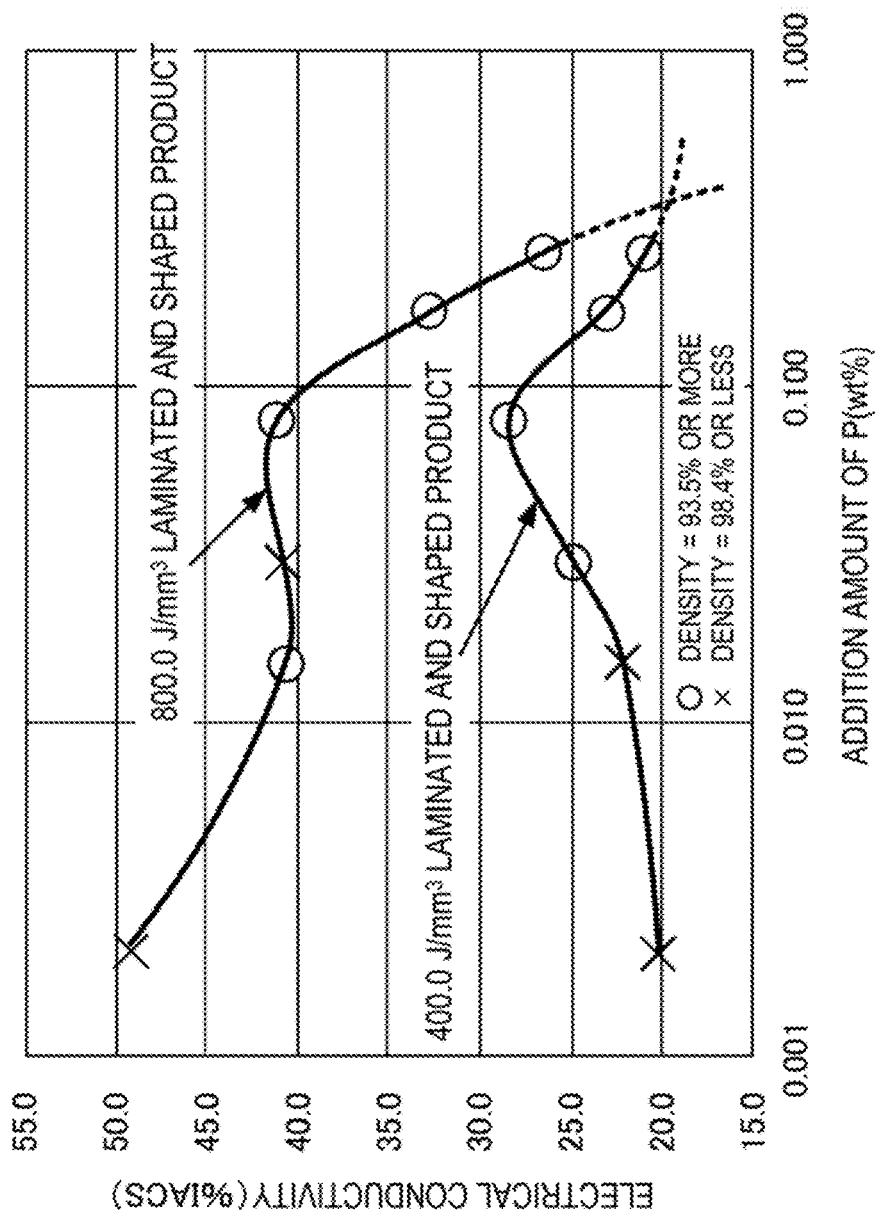
FIG. 6 is a graph showing the electrical conductivity of each of the laminated and shaped products using the copper powders of Examples 1 to 5 according to the present invention and Comparative Example 1.

◎ 99.0-100.0%
○ 98.5-98.9%
X 98.4% or less
— Laminating and shaping were impossible FIG. 6 is a graph showing the electrical conductivities of the laminated and shaped products using the copper powders of Examples 1 to 5 according to the present invention and Comparative Example 1.

As shown in Table 3 and FIGS. 4A to 4E and 6, laminated and shaped products satisfying (1) the density is 98.5% or more as the abovementioned condition were manufactured, as the laminated and shaped products manufactured by a laminating and shaping apparatus by using the lamination shaping copper powders to which a phosphorus element was added according to this example embodiment. Furthermore, laminated and shaped products satisfying (2) the electrical conductivity is 20% IACS or more were manufactured.

That is, a laminated and shaped product having a density of 98.5% or more cannot be manufactured at any energy density of 800.0 J/mm² or less if the content of a phosphorus element is less than 0.01 wt %. However, a laminated and shaped product can be manufactured by adjusting the energy density when the content of a phosphorus element is 0.01 wt % or more. In addition, a laminated and shaped product having a density of 99.0% or more cannot be manufactured at any energy density of 800.0 J/mm² or less if the content of a phosphorus element is less than 0.04 wt %. However, a laminated and shaped product can be manufactured by adjusting the energy density when the content of a phosphorus element is 0.04 wt % or more.

Also, a laminated and shaped product having an electrical conductivity of 20.0% IACS or more cannot be manufactured at any energy density of 800.0 J/mm² of less if the content of a phosphorus element exceeds 0.30 wt %. However, a laminated and shaped product can be manufactured when the content of a phosphorus element is 0.30 wt % or less. Especially when the content of a phosphorus element is 0.30 wt % or less, a laminated and shaped product can be manufactured at any energy density.

The invention claimed is:

1. A copper powder for lamination shaping in which a phosphorus element is mixed with pure copper to form a mixture,
   wherein an amount of the phosphorus element is equal to or more than 0.01 wt % and is equal to or less than 0.30 wt %, and
   wherein no element other than the phosphorus element is added to the pure copper.

2. The copper powder according to claim 1, wherein the amount of the phosphorus element is equal to or more than 0.04 wt %.

3. The copper powder according to claim 1, wherein the amount of the phosphorus element is equal to or less than 0.24 wt %.

4. The copper powder according to claim 1, wherein a 50% particle size of particles in the copper powder is 3 to 75 μm when measured by a laser diffraction method.

5. The copper powder according to claim 1, wherein an apparent density of particles in the copper powder is equal to or more than 3.0 g/cm³ when measured by a measurement method of JIS Z 2504.

6. The copper powder according to claim 1, wherein a flow rate of particles in the copper powder is equal to or less than 60 sec/50 g when measured by a measurement method of JIS Z 2502.

7. The copper powder according to claim 1, wherein the phosphorus element is added to the pure copper by a gas atomizing method.

* * * * *